United States Patent
Konegen et al.

[11] Patent Number: 5,836,824
[45] Date of Patent: Nov. 17, 1998

[54] CONVOLUTED BOOT WITH COATED COLLAR REGIONS

[75] Inventors: Herbert Konegen, Rösrath; Jürgen Kuhlit, Köln; Peter Jünemann, Lohmar, all of Germany

[73] Assignee: GKN Automotive AG, Lohmar, Germany

[21] Appl. No.: 844,037

[22] Filed: Apr. 18, 1997

[30] Foreign Application Priority Data

Apr. 20, 1996 [DE] Germany ............... 196 15 861.3

[51] Int. Cl.$^6$ ............................................. F16D 3/84
[52] U.S. Cl. ..................... 464/175; 277/636; 277/637
[58] Field of Search .................................. 464/170, 173, 464/175; 277/634, 636, 637, 630

[56] References Cited

U.S. PATENT DOCUMENTS

| | | | |
|---|---|---|---|
| 1,922,431 | 8/1933 | Geyer | 464/175 |
| 2,227,687 | 1/1941 | Wollner | 464/175 |
| 2,362,456 | 11/1944 | Alden | 464/175 |
| 2,473,618 | 6/1949 | Stillwagon, Jr. | 464/175 |
| 3,362,193 | 1/1968 | Ritsema | 464/175 |
| 3,807,195 | 4/1974 | Faulbecker | 464/173 |
| 4,558,869 | 12/1985 | Grove et al. | 277/630 |
| 4,572,693 | 2/1986 | Nakata et al. | 464/175 |
| 5,026,323 | 6/1991 | Fukumura et al. | 464/175 |
| 5,078,652 | 1/1992 | Baker | 464/175 |

FOREIGN PATENT DOCUMENTS

| | | | |
|---|---|---|---|
| 2927648 | 1/1981 | Germany | 464/175 |
| 3727872 | 2/1989 | Germany . | |
| 3603389 | 9/1989 | Germany . | |
| 61-266876 | 11/1986 | Japan | 464/175 |
| 261719 | 11/1987 | Japan | 464/175 |
| 1-229120 | 9/1989 | Japan | 464/175 |

OTHER PUBLICATIONS

English language abstract for JP 1–250673, Oct. 1989.

*Primary Examiner*—Eileen A. Dunn
*Attorney, Agent, or Firm*—Howard & Howard

[57] ABSTRACT

A convoluted boot made of thermoplastic elastomer for sealing an annular gap between two parts which are connected to one another so as to be rotationally fixed and articulatable relative to one another. The invention is especially useful in a constant velocity universal joint. The boot has two collar regions for being secured by a clamping element on the parts. A number of fold units extending between the collars. A base body is made of a thermoplastic material, and at least at one of the collar regions, is provided on its inside and outside with a coating. The coating material comprises a greater elasticity than the material of the base body.

9 Claims, 2 Drawing Sheets

CONVOLUTED BOOT WITH COATED COLLAR REGIONS

BACKGROUND OF THE INVENTION

This invention relates to a convoluted boot made of thermoplastic elastomer for sealing an annular gap between two parts connected to one another to be rotationally fixed but articulatable relative to one another. This invention is especially applicable to a constant velocity universal joint. The boot has two collar regions for being secured by a clamping element on the parts, and a number of fold units extending therebetween.

It is known that thermoplastic elastomers as compared to caoutchouc materials previously used for convoluted boots have a lower elasticity which, when fixing the collar regions to the respective parts, lead to several difficulties.

Slipping the collar regions on correspondingly shaped seat regions of the parts is extremely difficult and can lead to damage even at such an early stage if unsuitable tools are used. In this context it has to be taken into account that the inner diameter of the collar regions is slightly underdimensioned relative to the seat regions of the parts to ensure a firm fit at a later stage.

When clamping bands are used for generating an adequate pretension of the collar regions relative to the seat, the bands if produced from a simple metal plate material are not suitable, because of the low elasticity of the thermoplastic elastomer. It is therefore necessary to use expensive clamping bands made of high grade steel to permit the high tensile forces to be accommodated. The above-mentioned clamping bands are produced in the form of infinite rings with formed Ω-shaped ears whose inner circumference, by compressing same, is reduced and which are thus tensioned.

It is not possible to fit the above-mentioned high-grade steel clamping bands on the convoluted boot prior to slipping the collar regions onto the seat face of the respective parts, because the clamping bands comprise only a limited tensioning range.

DE 37 27 871 A1 proposes to provide the collar regions of a convoluted boot made of a thermoplastic elastomer with an arched or wavy cross-section. A radial pressure generated by clamping bands is intended to lead to caulking of the collar regions relative to the side flanks of an annular groove provided in the seat regions of the respective parts. In this embodiment, the clamping band generates uneven loads in the collar regions, which may lead to damage, even as early as during the assembly stage.

In DE 36 03 389 A1 it is proposed to provide the collar region of a convoluted boot made of thermoplastic elastomer with circumferentially distributed recesses or apertures to increase flexibility. This measure complicates the manufacture of the convoluted boot which is normally produced by blow-moulding. The increase in flexibility is based upon a weakening of the wall thickness, which further increases the risk of damage during assembly.

From Patent Abstracts of Japan M-914 Vol. 13/No. 593 it is known to provide a convoluted boot in the collar region with inner sealing elements which are made of a material which should be softer than that of the base body which consists of rubber or artificial resin of a certain hardness. The clamping elements are slipped directly onto the base body on the outside. The purpose of this measure is to simplify the operation of mounting the boots. The clamping bands are subjected to high loads because the material of the base body is highly non-flexible, so that in this case, expensive clamping bands may also become necessary. The clamping bands will bend to cut into the non-flexible material of the base body by means of sharp edges.

It is therefore the object of the present invention to improve a convoluted boot of the mentioned type in that, regardless of the material-related lower elasticity, it is easy to slip the collar regions onto the seat regions of the respective parts while at the same time making it possible to provide effective sealing by simple means, relative to the seat regions.

SUMMARY OF THE INVENTION

The inventive objective is achieved in that at least one of the collar regions, which receive a clamping element, is provided with a base body made of thermoplastic elastomer with inside and outside surfaces provided with a coating. The coating material has a greater elasticity than the material of the base body. The tensioning means are not included in the subject of the invention.

As a result of this measure, with a suitable coating thickness, the operation of slipping one collar region onto the respective part and pretensioning by a clamping band made of a conventional material are substantially improved and simplified. This is true because the convoluted boot in accordance with the invention behaves similarly to a boot made of a material with a much higher elasticity. This objective is achieved in that, in accordance with the invention, the inside and outside of the collar region are provided with the inventive coating.

As the assembly problems caused by the low elasticity of the thermoplastic elastomer are particularly serious in the case of a collar region with a smaller diameter, at least said collar region has to be provided with the characteristics in accordance with the invention. However, a more preferred embodiment has both collar regions comprising characteristics in accordance with the invention.

Sealing and pretensioning of the collar region relative to the seat region take place substantially in the region of the inner coating without the wall of the base body having to be substantially radially deformed in the collar region. Additionally, the pretension of the clamping band relative to the collar region, is preferably generated inside the outer coating, with only a small amount of radial deformation taking place at the wall made of thermoplastic elastomer, as already mentioned.

According to a first preferred embodiment the coating consists of a sheathing which, in longitudinal section, embraces the base body in the collar region on the inside and outside in a U-shaped form. This measure is particularly suitable if the coating is produced in situ, for example, by dipping the collar regions into a liquid coating material. Alternatively preformed annular elements in the form of edge coverings may be slipped onto the collar regions as coatings; they may be secured by internal tension; but preferably are glued or vulcanized in a cold condition onto the collar regions.

According to a second possible embodiment the coating consists of annular or strip-shaped claddings which rest on the inside surface and the outside surface of the base body in the collar region. This measure is particularly advantageous if the coating is placed onto the collar region in the form of a strip material and inserted into same on the inside. In this case, too, the coating can be glued or vulcanized on in the cold condition, at least for the purpose of fixing same during assembly.

If a particularly cheap and specifically lightweight coating material is used, the entire convoluted boot, on the inside and the outside, can be provided with the coating material. It can also be particularly advantageous if the coating material has an additional protective function for the convoluted boot to cushion the effect of impacts or reduce surface friction.

Rubber, caoutchouc or latex are suitable coating materials.

In view of the fact that the pretensioning effects are substantially generated in the coating, it is possible for the thermoplastic base body of the convoluted boot at the collar regions to be produced less accurately, i.e., it is possible to allow larger production tolerances relative to the basic dimension of the respective seat region at the joint part.

The pretensioning forces which are permitted to be lower due to the increased elasticity of the collar regions can be generated by clamping bands of a lower quality. It is also possible to fit the clamping bands onto the collar regions prior to slipping the latter onto the respective parts, because such clamping bands have a larger tensioning range.

The coating should extend relative to the respective clamping bands far enough to avoid any direct contact between the edges of the clamping bands and the boot base body to prevent any disadvantageous notch effects at the base body.

It is an advantageous feature that because of the resilience of the coating, the convoluted boot in accordance with the invention can be removed without damaging the boot. It has not been possible to ensure this in the case of known convoluted boots made of thermoplastic elastomer. In view of the design of the seat regions for the convoluted boots in those parts where the collar regions are slipped on, it is particularly advantageous that these do not necessarily have to be provided with grooves. Instead, they can be purely cylindrical in shape because the elasticity of the coating ensures accurate sealing and sufficient pretension.

A preferred embodiment of the invention will be described below with reference to the drawings.

DETAILED DESCRIPTION OF A PREFERRED EMBODIMENT

Figure 1:
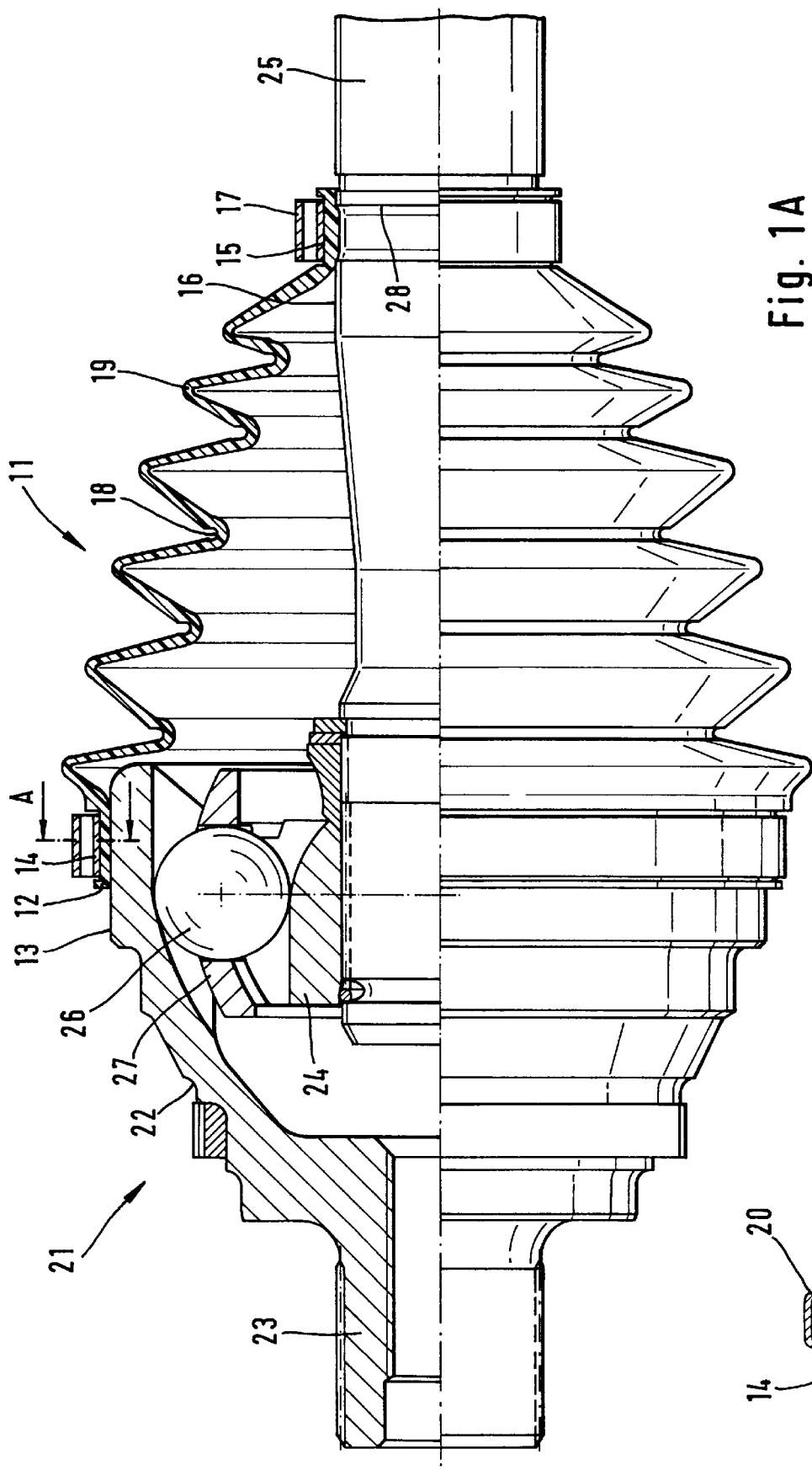
FIG. 1A shows a constant velocity universal joint with an inventive convoluted boot illustrated in the form of half a longitudinal section.
FIG. 1B is a detail along line A of FIG. 1B.

FIG. 1A shows a convoluted boot 11 together with a constant velocity universal joint 21 in an assembled condition. Half a longitudinal section is shown at the top and a plan view is shown at the bottom of the Figure. The constant velocity universal joint comprises an outer joint part 22 which is substantially bell-shaped and provided with a connecting journal 23. An inner joint part 24 receives a driveshaft 25, and balls 26 which, for torque transmitting purposes, engage tracks and which are controlled by a cage element 27.

By means of a first larger collar 12, the convoluted boot 11 is secured on the outside of the outer joint part 22. Collar 12 rests on the seat region 13 of the outer joint part 22 and is held in place by a clamping band 14. As can be seen in the longitudinal section, the seat region 13 is purely cylindrical. A smaller collar 15 rests on the seat region 16 of the shaft 25 and is held in place by a clamping band 17. As can be seen in the longitudinal section, the seat region 16 is provided with a wide annular groove 28 for the collar 15. The convoluted boot which, overall, extends approximately conically between the collar 12 and the collar 15 comprises conventionally shaped annular folds. A total of five inner folds 18 and six outer folds 19 are shown. A coating thickness is provided at collar regions 12, in the region of the thick lines, and cannot be seen in detail in FIG. 1A.

As shown in FIG. 1B clamping band 14 has an ear 20 is shown in the form of a detail. Ear 20 overlaps in the illustrated cross-section.

Figure 2:
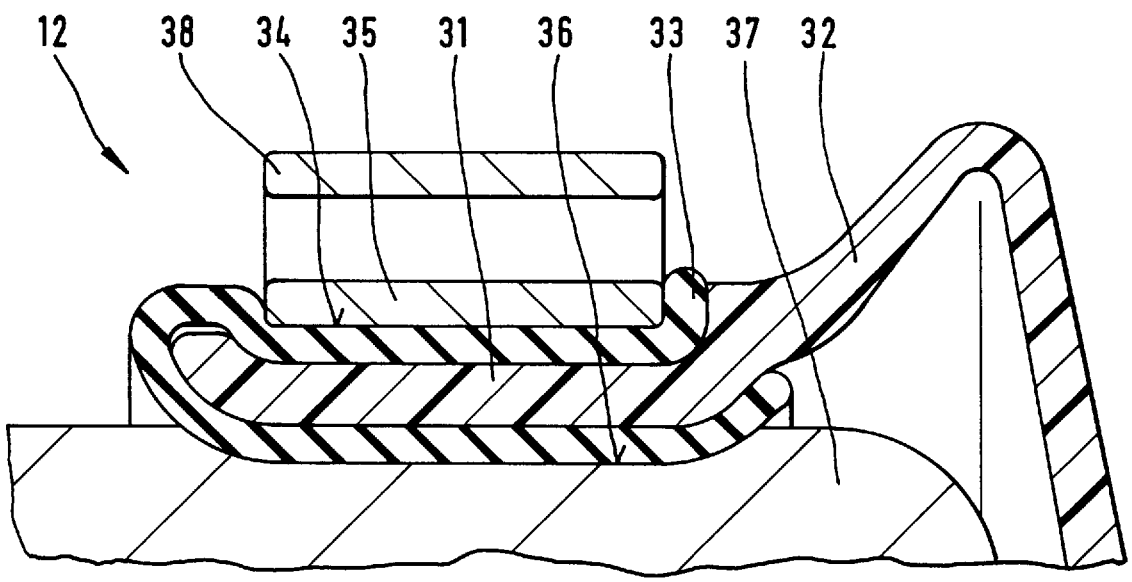
FIG. 2, in an enlarged scale, shows a first embodiment of a collar region of an inventive convoluted boot.

FIG. 2, in the form of half a longitudinal section, shows a collar region 12 of a convoluted boot. A base body 31 has an adjoining wall region 32 consisting of thermoplastic elastomer as well as an inventive coating consisting of a rubber-elastic material. In the longitudinal section, the coating is provided in the form of a U-shaped sheathing which envelops the base body 31 in the region of the collar 12. In the region of the collar 12, the base body 31 is provided in the form of a flat U-profile. The coating 33 which, in the collar region, in the cross-section, also extends U-like across the base body 31, consequently forms a flat groove 34 on its outer diameter. The groove 34 is engaged by a clamping band 35. The clamping band is double and is out in the region of an ear 38. On the inside diameter, the coating 33 projects bead-like and engages a groove 36 of a joint part 37. The thickness of the coating can be reduced considerably compared to the thickness shown here.

Figure 3:
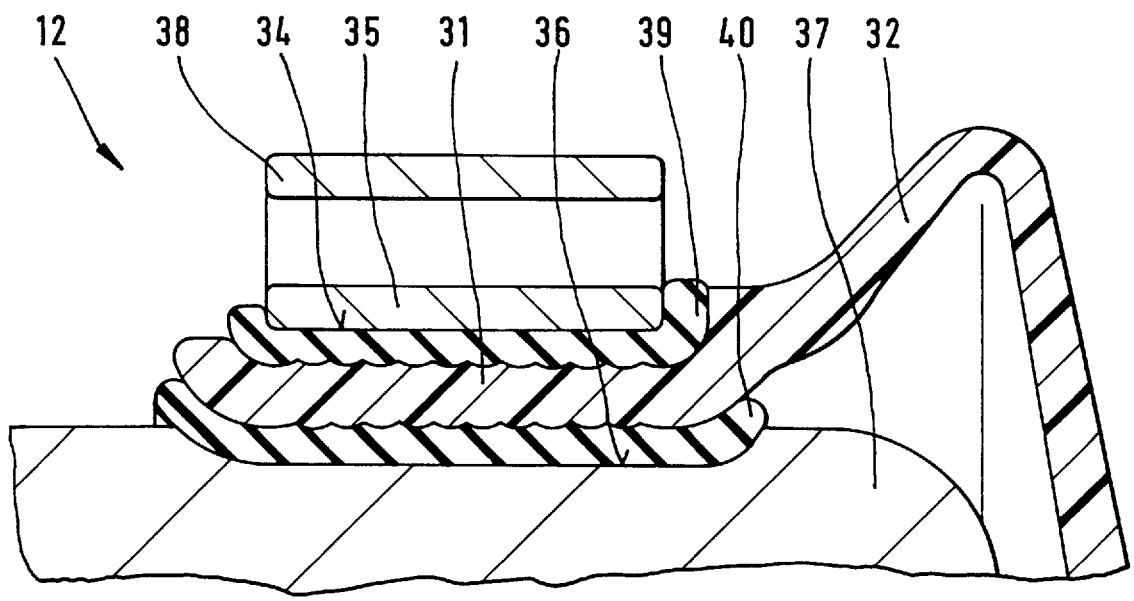
FIG. 3, in an enlarged scale, shows a second embodiment of a collar region of inventive convoluted boot.

FIG. 3, in the form of half a longitudinal section, shows a collar region 12 of a convoluted boot. A base body 31 has an adjoining wall region 32 consisting of thermoplastic elastomer, as well as an inventive coating consisting of a rubber-elastic material. The coating comprises an outer cladding 39 and an inner cladding 40 which, in the region of the collar 12, rest on the base body 31 and can be produced in the form of closed rings or cut band portions. In the region of the collar 12, the base body 31 is provided in the form of a flat U-profile. The surface of the collar region, on its inside and outside, is provided with flutes which extend in the circumferential direction for the purpose of forming an axially effective form-fitting connection with the cladding 39, 40. On its outside, the outer cladding 39 comprises a flat groove 34 which is engaged by a clamping band 35. The clamping band is double and is cut in the region of an ear 38. The inner cladding 40 projects bead-like and engages a groove 36 of a joint part 37. The thickness of the coating can be reduced considerably compared to the thickness shown here.

Preferred embodiments have been disclosed. The attached claims should be studied to determine the true scope of the present invention.

We claim:

1. A convoluted boot made of thermoplastic elastomer for sealing an annular gap between two parts which are connected to one another so as to be rotationally fixed and articulatable relative to one another comprising:

a boot having two closed annular collar regions for being secured by a clamping element each on the two parts, and having a number of fold units extending therebetween, at least at one of said collar regions provided with a base body made of thermoplastic elastomer having inside and outside surfaces provided with a coating from a material having a greater elasticity than the material of said base body.

2. A convoluted boot according to claim 1, characterized in that said coating consists of a sheathing which, in the longitudinal section, embraces said base body in the collar region on the inside and the outside in a U-shaped form.

3. A convoluted boot according to claim 2, characterized in that said coating forms a prefabricated annular member on said base body.

4. A convoluted boot according to claim 2, characterized in that said coating is cold-vulcanized onto said base body.

5. A convoluted boot according to claim 1, characterized in that said coating consists of one of annular and strip-shaped claddings which rest on the inside and the outside of said base body in said collar region.

6. A convoluted boot according to claim 5, characterized in that said coating is cold-vulcanized onto said base body.

7. A convoluted boot according to claim 1, characterized in that said coating is produced in situ on said base body.

8. A convoluted boot according to claim 1, characterized in that said coating material is one of rubber, caoutchouc or latex.

9. A convoluted boot according to claim 1, characterized in that said base body, on said at least one of said collar regions has a surface provided with circumferentially extending flutes.

* * * * *